April 12, 1938.  S. JACOBS  2,113,730
LOOM
Filed May 25, 1937  7 Sheets-Sheet 1

Inventor
Samuel Jacobs
By Clarence A. O'Brien
Hyman Berman
Attorneys

April 12, 1938.  S. JACOBS  2,113,730
LOOM
Filed May 25, 1937   7 Sheets-Sheet 3

Inventor
Samuel Jacobs
By Clarence A. O'Brien
Hyman Berman
Attorneys

April 12, 1938.    S. JACOBS    2,113,730
LOOM
Filed May 25, 1937    7 Sheets-Sheet 5

Inventor
Samuel Jacobs

April 12, 1938. S. JACOBS 2,113,730
LOOM
Filed May 25, 1937 7 Sheets-Sheet 7

Inventor
Samuel Jacobs
By Clarence A. O'Brien
Hyman Berman
Attorneys

Patented Apr. 12, 1938

2,113,730

UNITED STATES PATENT OFFICE 2,113,730

LOOM

Samuel Jacobs, New York, N. Y.

Application May 25, 1937, Serial No. 144,723

5 Claims. (Cl. 139—16)

My invention relates to improvements in weaving machines, or looms, for weaving fabric in tubular form.

As is well known, certain garments for feminine wear, particularly underwear and gowns, are formed from fabric cut on the bias to provide for close fitting and flexibility. Such garments are usually cut from fabrics of standard width, the width of the fabric limiting the length of a piece which can be cut therefrom on the bias as will be understood.

Having the foregoing in mind it is the principal object of my invention to provide an efficient practical machine equipped for economically weaving fabric in tubular form and of any desired length from which by cutting spirally around the same longer pieces may be cut on the bias than can be obtained from standard widths now manufactured.

To the accomplishment of the foregoing and other objects presently appearing, a preferred embodiment of my invention has been illustrated in the accompanying drawings, set forth in detail in the following description, and defined in the claims appended hereto.

Describing my invention in detail, with reference to the drawings by numerals, in the illustrated embodiment thereof, the operating parts of the machine are supported on a frame work of tubing comprising a plurality, four in this instance, of uprights 2 arranged in the form of a square and connected together in pairs at their upper ends by a spider 3 comprising a pair of tubular arms 4 intersecting in the vertical center of the frame, and braces 5 connecting said arms and uprights. On the underside of the spider 3, centrally thereof and integrally therewith, is a socketed boss 6 from which a short shaft 7 depends, the shaft being provided with a head 8 secured in said boss 6 by an apertured cap plate 9 and screw bolts 10. A pin 11 passing through the boss 6 and the head 8 locks the shaft 7 to said boss against rotation. At a suitable distance below the spider 3 is a pair of annular platelike inner and outer creels 12 and 13, respectively, the former smaller than the latter, and mounted in fixed, spaced apart, concentric relation in a common plane, the inner creel 12 on an intermediate part of the shaft 7, as at 14, and the outer creel 13 on sleeve like brackets 15 suitably secured to the uprights 2. Each creel 12 and 13 includes two circular series of upright spindles, 16 on the inner creel and 17 on the outer creel, on which are rotatably mounted warp feeding bobbins, 18 in the case of the inner creel, and 19 in the case of the outer creel. There are the same number of bobbins 18 and 19 on each creel. In each case the spindles, and the related bobbins are staggered in one series relative to those in the other to permit the warp threads to be trained over the same side of the creel, 12, or 13, as the case may be.

Figure 1:
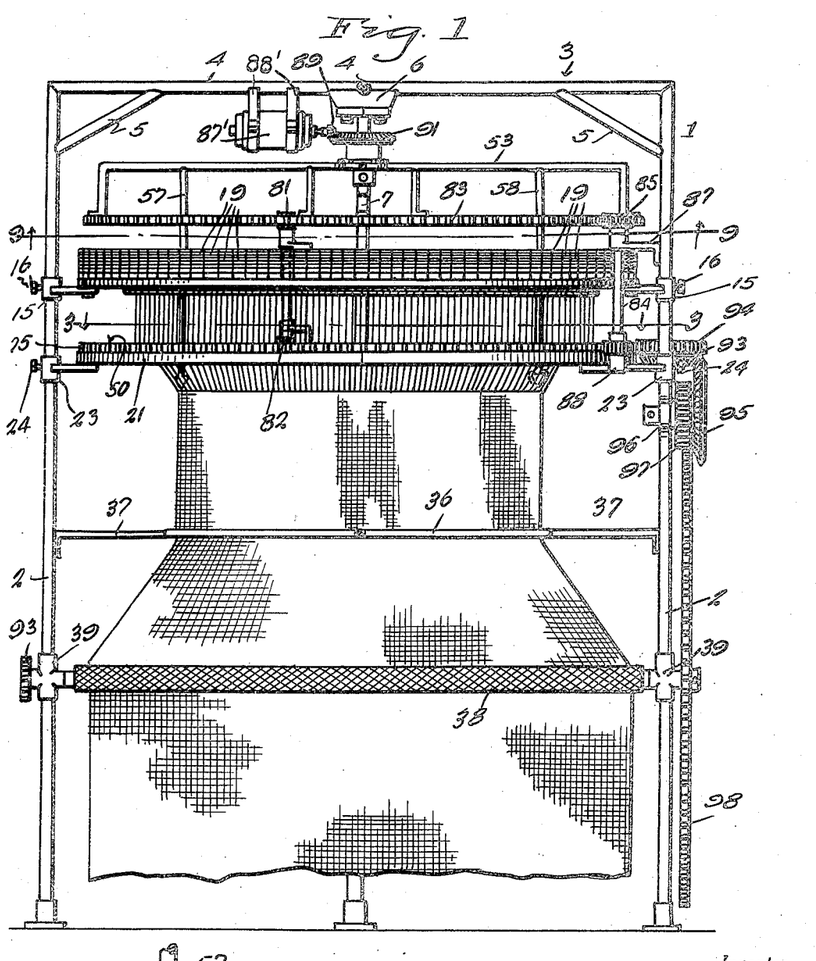
Figure 1 is a view in front elevation of a machine constructed in accordance with my invention.
Figure 2:
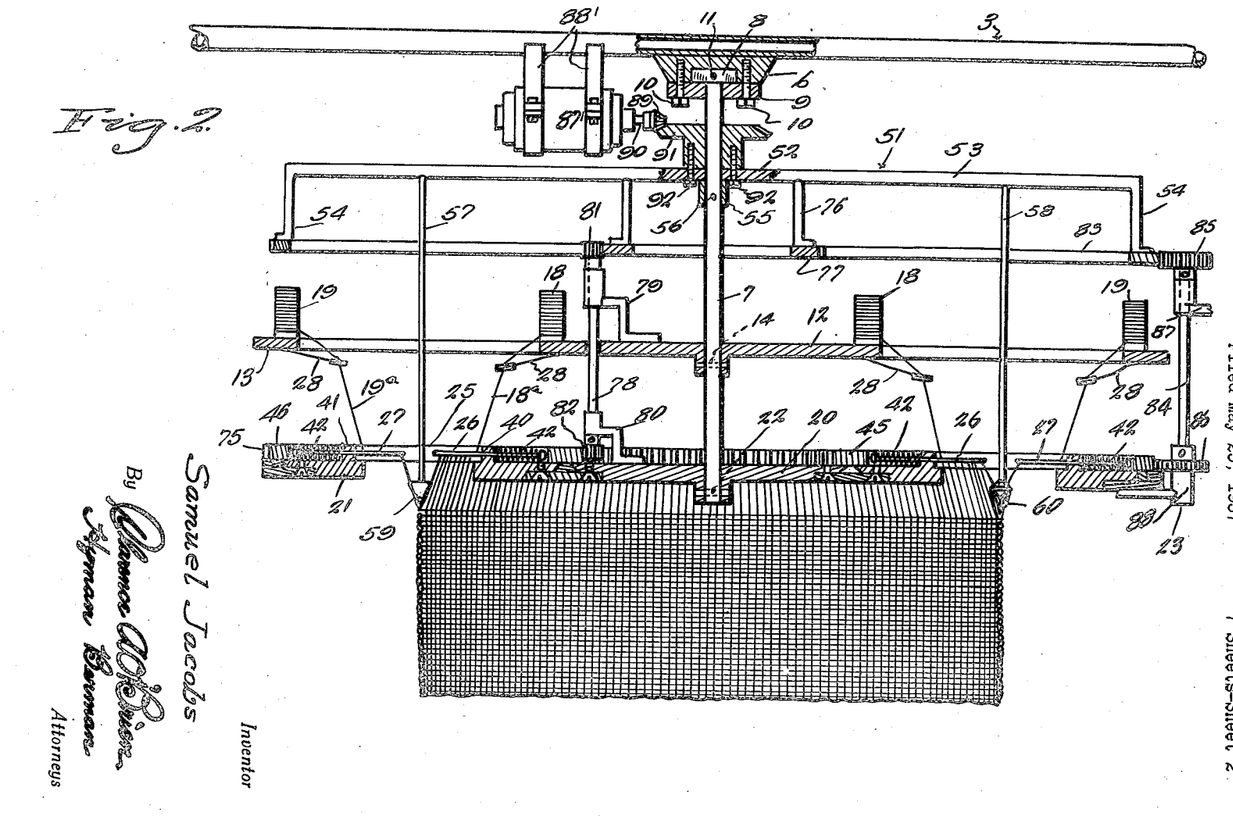
Figure 2 is a fragmentary view in transverse section, of the upper portion of the machine, drawn to an enlarged scale.

The warp threads, hereinafter designated inner and outer warp threads 18a and 19a, respectively, are trained downwardly over the opposed outer and inner edges of the inner and outer creels, 12 and 13, through the space between said edges, in two circular series of warp ends as best represented in Fig. 2.

At a suitable distance below the creels 12 and 13 is a pair of inner and outer annular needle supports 20 and 21 mounted in fixed, concentric, spaced apart relation in a common plane, the former on the lower end of the shaft 7, as at 22, and the latter by sleeve like brackets 23 secured to the uprights 2 by set screws 24. The needle supports 20 and 21 are also concentric to the creels 12 and 13 and dimensioned to provide an annular gap 25 between the opposed edges thereof somewhat narrower than that between the creels 12 and 13 and centered relative to the last mentioned gap below the same. On the upper side of each needle support 20 and 21, is a circular series of radially disposed needles, 26 on the inner support and 27 on the outer one. The series of needles 26 and 27 are arranged with the eyelet ends thereof in opposed relation over the gap 25. As will be understood the inner and outer series of needles 26 and 27 are related to the inner and outer creels 12 and 13, respectively, the number of needles in each series corresponding to the number of bobbins 18 and 19 on the related creel, the needles in each instance being vertically aligned with the related bobbins 18 and 19 of said creels.

Figure 8:
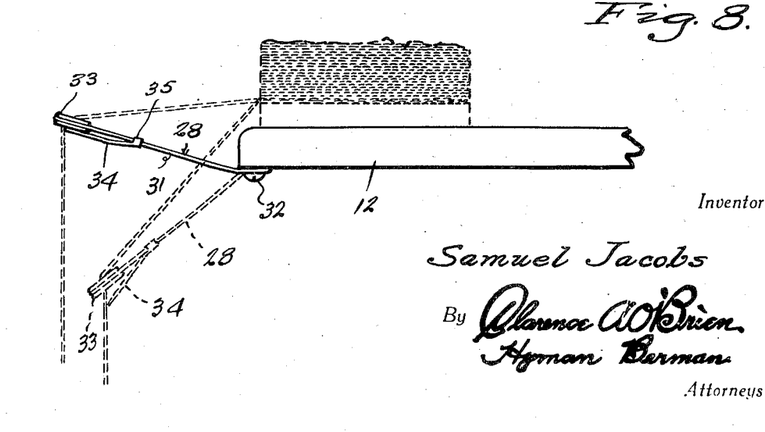
Figure 8 is a view in side elevation, of fragmentary character, illustrating the operation of the warp tensioning device.
Figures 9, 15, 17:
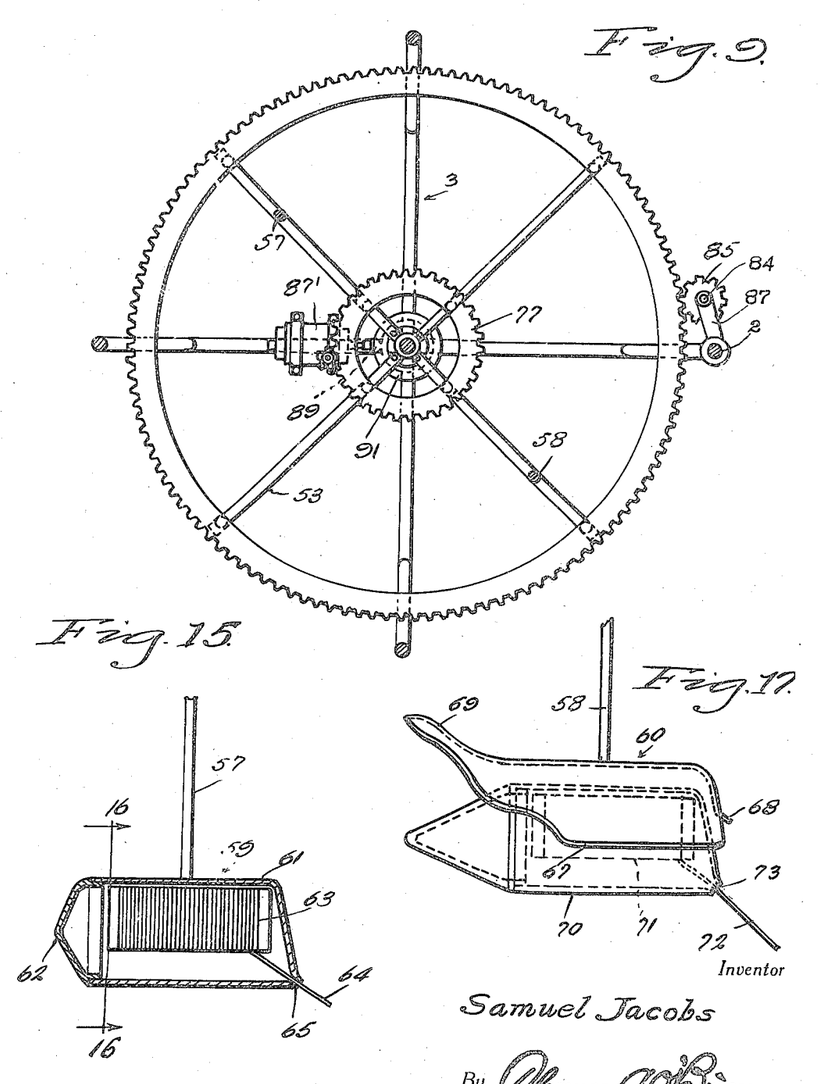
Figure 9 is a view in transverse section taken on the line 9—9 of Fig. 1, looking upwardly.
Figure 15 is a view in vertical longitudinal section of the leading shuttle.
Figure 17 is a view in side elevation of a trailing shuttle.
Figures 10, 11, 12, 13:
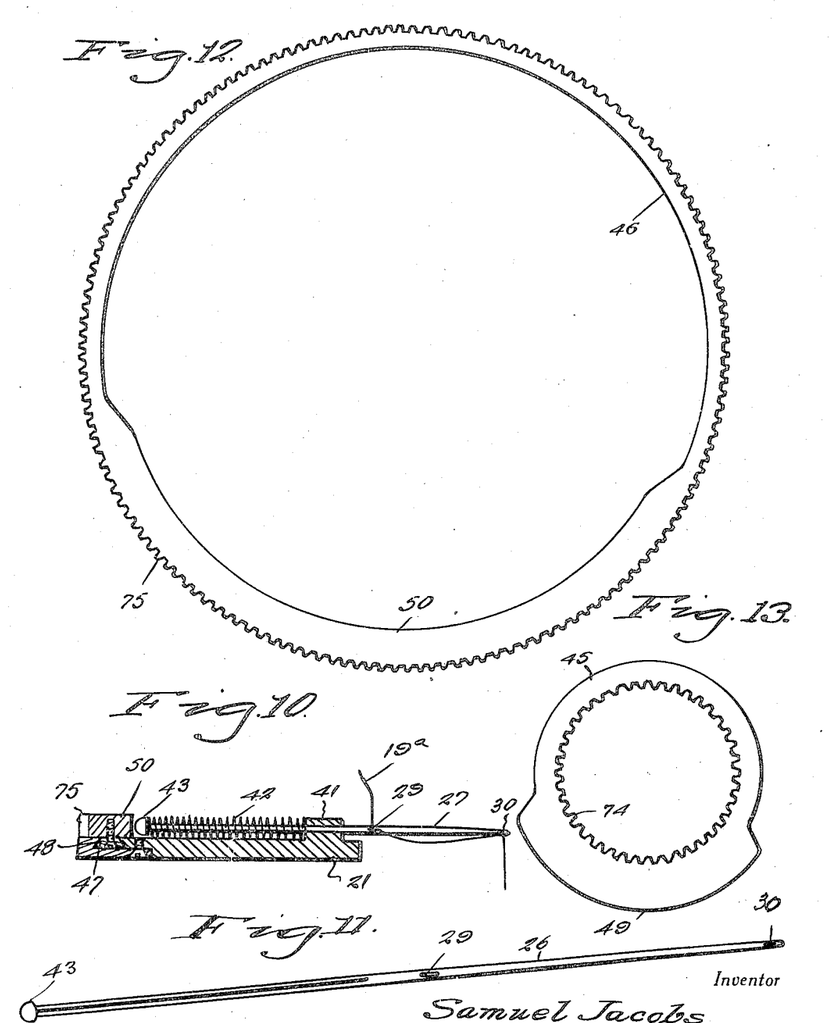
Figure 10 is a detail view in transverse section of the outer needle support.
Figure 11 is a view in perspective of one of the needles.
Figure 12 is a view in top plan of the needle operating cam for the outer needle support.
Figure 13 is a similar view of the needle operating cam for the inner needle support.

The warp ends are threaded through related tensioning devices 28 extending from opposed edges of the creels 12 and 13 and thence through related needles 26 or 27 as the case may be. Preferably the needles 26 and 27 are each provided with an intermediate eyelet 29 and a terminal eyelet 30 as shown in Fig. 10, the warp ends being threaded through said eyelets 29 and 30 successively. The tensioning devices 28 each comprise a resilient vertically swingable arm 31 secured at one end, as at 32, to the related creel, 12 or 13, a porcelain eye 33 on the other end of said arm through which the warp end passes and a resilient finger 34 secured at one end, as at 35, to the under side of the arm 31 with its other end bearing against the warp thread. The arrangement of the described parts of the tensioning devices 28 is such that the arms 31 normally flex upwardly, as in Fig. 8, the fingers 34 frictionally gripping the thread, 18a or 19a and drawing the same taut between said fingers and needles 26 and 27. Under downward pull on the threads 18a, 19a, the arms 31 flex downwardly, as shown by dotted lines in Fig. 8, the fingers 34 flexing away from the threads and thereby permitting free feed of the threads through said devices. As will be seen in Fig. 8, the tensioning devices normally form tensioning loops in the warp threads 18a, 19a.

From the needles 26 and 27 the warp ends are lead downwardly in two circular series to the weaving point then through an annular guide 36 secured to the uprights 2, as by brackets 37, below the needle supports 20 and 21 and concentrically thereto. From the guides 36 the fabric is lead between a pair of horizontal tensioning and take-off rollers 38 journaled at their ends, side by side, in the center of the frame 1, in suitable brackets 39 secured to one of the pairs of uprights 2. The rollers 38 are driven by drive mechanism to be described.

Returning now to the needles 26 and 27, said needles are the shed forming instrumentalities and to this end are suitably mounted on their respective supports, 20 and 21, for sliding movement radially in opposite directions, respectively, to cross the terminal eyelet ends thereof in pairs and to uncross the same. In this instance, the needle mountings comprise a pair of annular bearing flanges 40 and 41 on the upper faces of the supports 20 and 21, respectively, adjacent to the opposed edges thereof and in which the needles 26 and 27 are slidably mounted intermediate their ends. The needles 26 and 27 are urged toward a normal, retracted, and uncrossed position, in which the terminal eyelet ends of one series is spaced from similar ends of the other, as shown in Fig. 2, by means of tension springs 42 on said needles, respectively, interposed between the bearing flanges 40 and 41 and heads 43 on the ends of the needles opposite the terminal eyelet ends thereof. The crossed position of the needles 26 and 27 is established by means now to be described.

Figure 3:
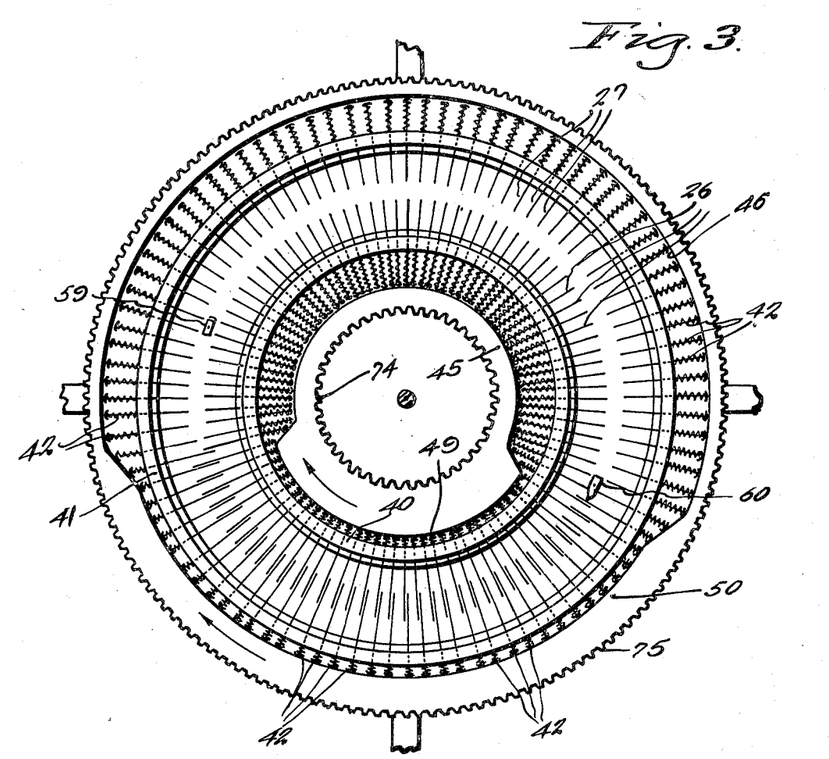
Figure 3 is a view in top plan of a pair of needle supports and needle operating cams.
Figure 4:
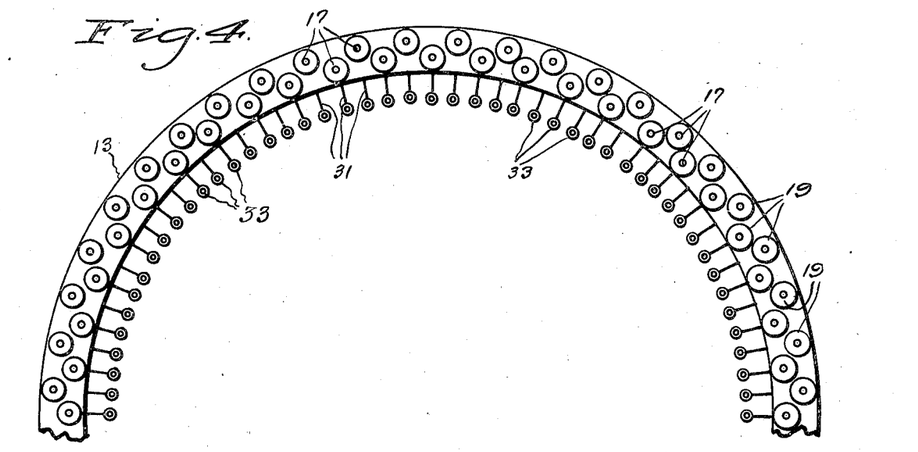
Figure 4 is a fragmentary view in top plan of an outer creel with which the machine is equipped.
Figures 5, 6, 7:
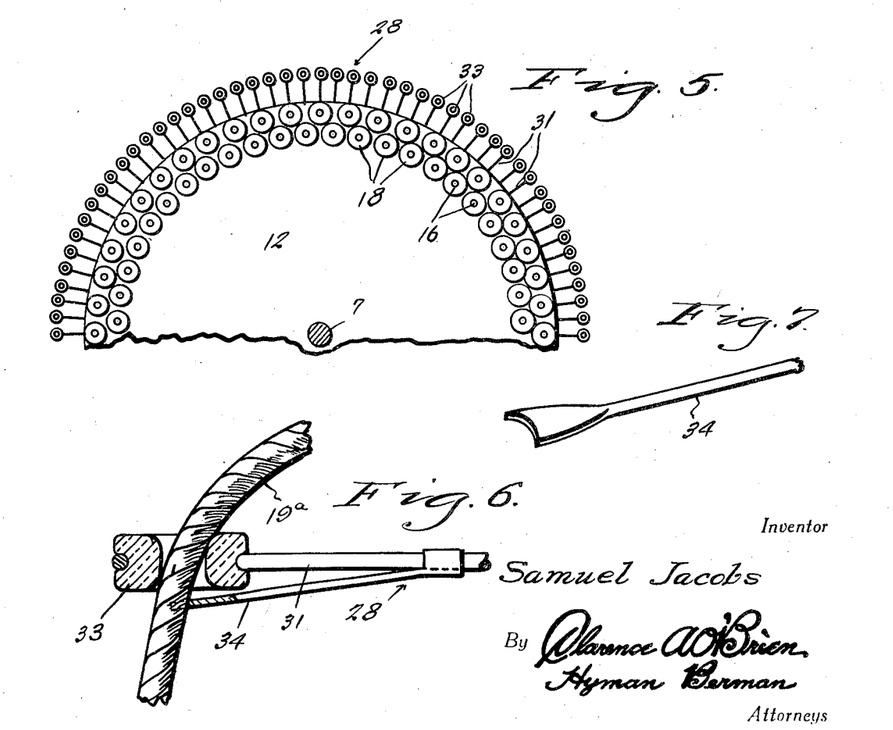
Figure 5 is a similar view of an inner creel.
Figure 6 is a detail view partly in side elevation and partly in transverse section of a warp tensioning device.
Figure 7 is a view in perspective of a tensioning finger forming part of the warp tensioning device.

A pair of inner and outer needle operating cams 45 and 46, of flat annular form, are mounted on the needle supports 20 and 21, respectively, for rotation in unison each in surrounding concentric relation to the heads 43 of the needles of the related support for wiping engagement therewith and whereby upon rotation thereof the needles 26 and 27 are moved from normal position into crossed relation. The mounting of the cams 45 and 46 may be of any suitable form, for instance dovetailed annular flanges and grooves, 47 and 48, formed on each cam and in the related support, respectively, as shown in Fig. 2. As best shown in Fig. 3, a pair of high segmental edge portions 49 and 50 are formed on the cams 45 and 46, respectively in opposed relation and extending substantially one third way around each cam, whereby substantially one third of the needles 26 and 27 in each series are simultaneously moved toward the needles of the other series into crossed relation as shown in Fig. 3, said movement of the needles being progressively effected around the series, and said crossed needles returning to normal uncrossed and separated relation under the action of the springs 42 as the high portions 49 and 50 wipe past the heads 43 thereof. The needle operating cams 45 and 46 are rotated in unison by driving mechanism, subsequently described, in the direction indicated by the arrows in Figs. 3 i. e. clockwise.

The described movement of the needles 26 and 27 crosses the warp threads 18a, 19a over the weft threads and forms the sheds in said warp threads for receiving the weft threads which are laid therein as follows.

Intermediate the creels 12 and 13, and the spider 3, is a shuttle operating spider 51 comprising a hub 52 rotatable on the shaft 7 and arms 53 radiating from said hub and terminating in depending ends 54. A collar 55 pinned to the shaft 7, as at 56, supports the spider 51. Depending from the radiating arms 53 in diametrically opposed relation, and through the space between the series of needles 26 and 27, and through the gap 25, is a pair of vertical shuttle carrying rods 57 and 58, respectively, each having suspended from its lower end, as presently described, a shuttle, 59 in the one instance and 60 in the other, revolved by the described shuttle operating spider in the sheds of the warp threads. The shuttle 59 may appropriately be termed the leading shuttle and 60 the trailing shuttle since the former precedes the latter in the weaving operation, or in other words during revolution of said shuttles.

The leading shuttle 59 comprises a suitable bobbin casing 61, preferably of inverted cone shape in cross section, provided with a removable conical front end 62 and a spool like bobbin 63 loosely fitted in said casing for free rotation therein under pull exerted on the weft threads 64 which as will be understood is fed from said bobbin 63. The weft thread 64 is threaded through a suitable aperture 65 in the rear end of the casing 61 to be laid in the sheds of the work as the shuttle is revolved. The shuttle casing 61 has its upper wall secured to the lower end of the rod 57 in any suitable manner as by soldering.

The trailing shuttle 60 comprises a shell like warp deflecting, shoe 66 of transversely concave form suitably secured intermediate its ends to the lower end of the rod 58 and having downwardly extending convergent sides 67, a closed rear end 68, and an upwardly inclined pointed and open front end transversely concaved and forming a warp deflecting beak 69 for a purpose presently seen. A bobbin casing 70, similar to casing 61, is loosely suspended in the shoe 66, by the sides 67 thereof, so that said casing is removable forwardly, free to move upwardly in said casing for a purpose presently described, and impelled forwardly by the rear end of said casing. A bobbin 71, similar to bobbin 63, is loosely deposited in the casing 70 to feed a weft thread 72 therefrom through an aperture 73 in said casing. The trailing bobbin casing 70 is supported at substantially the same level as the leading bobbin casing 61. As best shown in Fig. 3, the leading shuttle 59 travels well in advance of the high portions 49 and 50 of the needle operating cams 45 and 46 and the trailing shuttle 60 travels with its nose directly under the last pair of crossed needles 26 and 27.

Coming now to the drive mechanism, and first with reference to the needle operating cams 45 and 46, the edge of the inner cam 45, opposite to the camming edge thereof, is toothed, as at 74, and the corresponding edge of the outer cam 46 is similarly toothed as at 75. Fixed to the shuttle operating spider 51, concentrically of the inner cam 45, by arms 76 thereon, is an annular gear 77 operatively connected to the inner cam 45 by means of a vertical shaft 78 journaled in a pair of bearing brackets 79, 80, mounted on the inner creel 12, and inner needle support 20, respectively, said shaft extending through the latter, and having a pair of gear pinions 81, 82 fast thereon and meshing with the gear 77 and the teeth 74 of said cam 49 respectively. A second annular gear 83 is fast on the arms 54 of said operating spider 51 and operatively connected to the outer cam 46 by means of a vertical shaft 84 and a pair of gear pinions 85, 86 fast on said shaft and meshing with said gear 83 and the teeth 75 on said outer cam 46 respectively. The shaft 84 is journaled in suitable bearings 87, 88 fixed to one of the uprights 2 and to one of the before mentioned brackets 23 respectively. The shuttle operating spider 51 is driven, in the same direction as the shuttle operating cams 45 and 46, by means of a motor 87' suspended from the spider 3, by hangers 88', and geared to said spider 51 by means of a bevelled gear 89 fast on the armature shaft 90 thereof and meshing with a similar gear 91 revolving on the shaft 7, and suitably secured to the hub 52 of said spider 51 as by bolts 92.

The beforementioned tension and take-off rollers 38 are geared together at one end thereof, for rotation in opposite direction, by a pair of intermeshing gears 93 fast on corresponding ends of said rollers respectively. One of said rollers 38 is driven at its opposite ends by the outer cam 46 through reduction gearing as follows: Suitably mounted on one of the uprights 2 is a gear 94 meshing with the teeth 75 on the cam 46 and having a bevel gear 93 fast thereto meshing with a larger bevel gear 95 suitably mounted for rotation on a bracket 96 secured to the last mentioned upright 2. Gear 95 has fixed thereto a small gear 97, which meshes with a large gear 98 fast on the driven end of said driven roller 38. It will be understood that the rollers 38 are rotated in the proper direction to exert a slight downward pulling and feeding action on the fabric.

Figures 14, 18, 22:
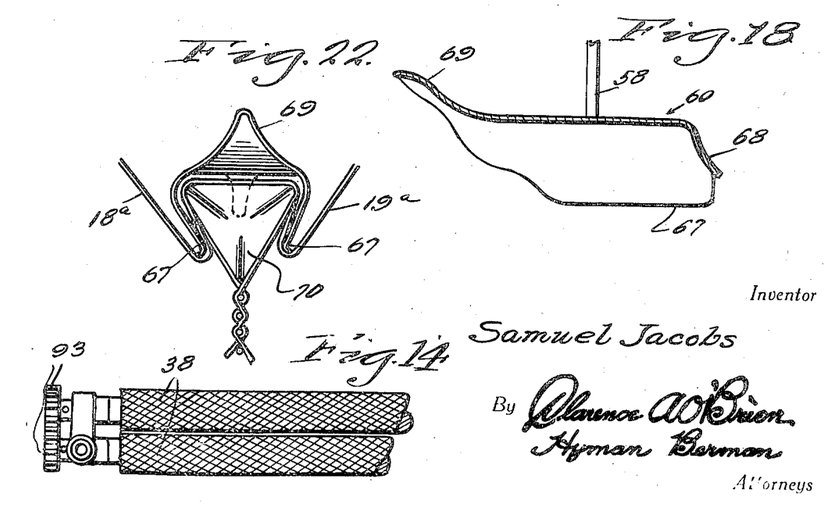
Figure 14 is a fragmentary view in top plan of tensioning and take-off rollers.
Figure 18 is a view in longitudinal section of a warp deflecting shoe forming part of the trailing shuttle.
Figure 22 is still another similar view further illustrating operation of the trailing shuttle.
Figure 16:
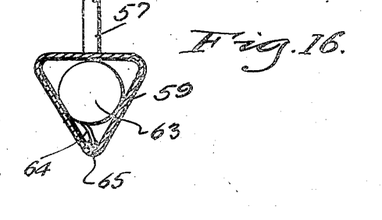
Figure 16 is a view in vertical transverse section of said leading shuttle taken on the line 16—16 of Fig. 15 looking in the direction indicated by the arrows.
Figures 19, 20, 21:
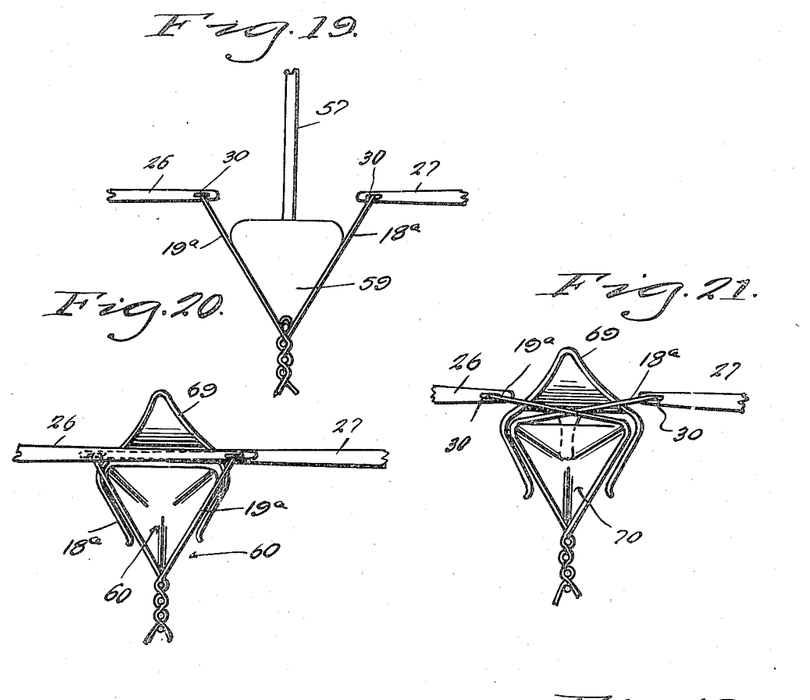
Figure 19 is a view in rear elevation of the leading shuttle illustrating the operation by the same of laying a weft thread in the warp sheds.
Figure 20 is a view in front elevation of the trailing shuttle illustrating the operation thereof.
Figure 21 is a similar view further illustrating operation of the trailing shuttle.

Referring now to the operation, the warp ends of the thread 18a and 19a being threaded in the manner described, a circular V-shed is formed by the inner and outer warp ends 18a, 19a between the needles 26 and 27 and the guide 36. The motor 87' being started the shuttle operating spider 51, and the needle operating cams 45 and 46, are revolved clockwise whereupon the following operations take place. First the leading shuttle 59 lays a weft thread 64 in the shed of the warp threads 18a, 19a as illustrated for instance in Figure 19. Second, the high portions 49 and 50 cross the needles 26 and 27 behind said leading shuttle 59 thereby crossing said warp threads over the weft thread 64 as will be clear and as shown for instance in Fig. 20. During this operation the nose of the bobbin casing 70 of the trailing shuttle 60 enters the shed formed by the last pair of crossed needles 26 and 27, and the beak 69 thereof moves over said needles whereby when the needles of said pair separate said shed is held open by the casing 70 and the said weft threads cross over said casing as shown in Fig. 21. Coincidentally with separation of said pair of needles 26 and 27, and the crossing of said threads over the casing 70, the latter moves through the opened shed and lays the weft thread 72 in said shed. As an incident to the laying of the weft threads 72 by the trailing shuttle 60, the warp threads through which the casing 70 passes slide off the latter rearwardly between the warp deflector shoe 66 and said casing, the sides 67 on the shoe deflecting said threads downwardly as shown in Fig. 22 as said shoe passes over successively separating needles 26 and 27. As will now be seen successively crossing needles 26 and 27 close, or cross, the warp threads successively over the leading weft thread 64 laid by the leading shuttle 59, and successively uncrossing, or separating, needles 26 and 27, effect the same operation over the trailing weft thread 72. Also the base of the leading shuttle casing 59 beats up, or packs the trailing weft thread 72 laid and deposited by the trailing shuttle 60, and the casing 70 of the trailing shuttle 60 performs the same operation on the leading weft thread 64 laid by the leading shuttle 59. It is furthermore to be noted that two weft threads are woven in simultaneously and separately.

At each complete revolution of the cams 45, 46, and the shuttles 59 and 60, the fabric is pulled downwardly by the rollers 38 in degree corresponding to the spacing between two weft threads, it being understood that the described drive to said rollers is properly timed to affect such operation by said rollers.

The operation and advantages of my invention will, it is believed, be clear from the foregoing description without further explanation.

Manifestly the invention, as described, is susceptible of modification as regards details of construction and relations of parts and right is therefore reserved herein to all such modifications falling within the scope of the claims appended hereto.

What I claim is:—

1. In a loom, a pair of annular horizontally disposed creels mounted one within the other in concentric spaced apart relation and including bobbins thereon for feeding pairs of opposed warp threads downwardly between the creels in circular formation, means below said creels for forming sheds in said pairs of warp threads successively including pairs of opposed circularly arranged needles through which said warp threads are threaded, the needles of each pair movable into and from crossed relation to shed said threads, means for moving said pairs of needles successively into and from crossed relation, and means for laying weft threads in the sheds comprising a pair of leading and trailing weft laying shuttles, respectively, revolving through the sheds, the leading shuttle in advance of crossed needles, the trailing shuttle revolving beneath pairs of crossed needles successively and coincidentally with uncrossing movement thereof and separating the warp threads of uncrossing needles in opposition to the pull exerted on said separated threads by uncrossing movement of the needles, whereby said separated threads are crossed over said trailing shuttle, the trailing shuttle being mounted to provide for sliding of the crossed threads rearwardly off the same into crossed relation over the weft threads laid thereby.

2. In a loom, a pair of annular horizontally disposed creels mounted one within the other in concentric spaced apart relation and including bobbins thereon for feeding pairs of opposed warp threads downwardly between the creels in circular formation, means below said creels for forming sheds in said pairs of warp threads successively including pairs of opposed circularly arranged needles through which said warp threads are threaded, the needles of each pair movable into and from crossed relation to shed said threads, means for moving said pairs of needles successively into and from crossed relation, and means for laying a weft thread into said sheds comprising a shuttle revolving beneath pairs of crossed needles successively and coincidentally with uncrossing movement thereof and separating the warp threads of uncrossing needles in opposition to the pull exerted on said separated threads by uncrossing movement of the needles, whereby said separated threads are crossed over said shuttle, the shuttle being mounted to provide for sliding of the crossed threads rearwardly off the same into crossed relation over the weft thread laid thereby.

3. In a loom, a pair of annular horizontally disposed creels mounted one within the other in concentric spaced apart relation and including bobbins thereon for feeding pairs of opposed warp threads downwardly between the creels in circular formation, means below said creels for forming sheds in said pairs of warp threads successively including pairs of opposed circularly arranged needles through which said warp threads are threaded, the needles of each pair movable into and from crossed relation to shed said threads, means for moving said pairs of needles successively into and from crossed relation, and means for laying a weft thread in said sheds comprising a shuttle revolving beneath pairs of crossed needles successively and coincidentally with uncrossing movement thereof and separating the warp threads of uncrossing needles in opposition to the pull exerted on said separated threads by uncrossing movement of the needles, and means suspending the shuttle and providing a clearance between the same and the shuttle whereby said crossed threads may slide rearwardly off the shuttle in crossed relation over the weft threads laid thereby.

4. In a loom, a pair of annular horizontally disposed creels, mounted one within the other in concentric spaced apart relation and including bobbins thereon for feeding pairs of opposed warp threads downwardly between the creels in circular formation, means below said creels for forming sheds in said pairs of warp threads successively including pairs of opposed circularly arranged needles through which said warp threads are threaded, the needles of each pair movable into and from crossed relation to shed said threads, means for moving said pairs of needles successively into and from crossed relation, and means for laying a weft thread in said sheds comprising a shuttle revolving beneath pairs of crossed needles successively and coincidentally with uncrossing movement thereof and separating the warp threads of uncrossing needles in opposition to the pull exerted against said separated threads by uncrossing movement of the needles, and means suspending and propelling the shuttle comprising a shell-like carrier spanning the sides and rear end of the shuttle and in which the latter is vertically movable to provide a clearance between the same and said carrier through which said crossed threads may slide rearwardly off said shuttle into crossed relation over the weft thread laid thereby.

5. In a loom, a pair of annular horizontally disposed creels, mounted one within the other in concentric spaced apart relation and including bobbins thereon for feeding pairs of opposed warp threads downwardly between the creels in circular formation, means below said creels for forming sheds in said pairs of warp threads successively including pairs of opposed circularly arranged needles through which said warp threads are threaded, the needles of each pair movable into and from crossed relation to shed said threads, means for moving said pairs of needles successively into and from crossed relation, and means for laying a weft thread in said sheds comprising a shuttle revolving beneath pairs of crossed needles successively and coincidentally with uncrossing movement thereof and separating the warp threads of uncrossing needles in opposition to the pull exerted against said separated threads by uncrossing movement of the needles, and means suspending and propelling the shuttle comprising a shell-like carrier spanning the sides and rear end of the shuttle and in which the latter is vertically movable to provide a clearance between the same and said carrier through which said crossed threads may slide rearwardly off said shuttle into crossed relation over the weft thread laid thereby, said carrier having sides and an upturned beak over-riding said crossed threads to deflect the same through said clearance.

SAMUEL JACOBS.